United States Patent
Altamura

(10) Patent No.: US 9,523,424 B2
(45) Date of Patent: Dec. 20, 2016

(54) EPICYCLIC TRANSMISSION PROVIDED WITH A LUBRICATING SYSTEM

(71) Applicant: GE AVIO S.R.L., Rivalta di Torino (IT)

(72) Inventor: Paolo Altamura, Monopoli (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 14/698,723

(22) Filed: Apr. 28, 2015

(65) Prior Publication Data

US 2015/0316141 A1 Nov. 5, 2015

(30) Foreign Application Priority Data

Apr. 30, 2014 (IT) .............................. TO2014A0351

(51) Int. Cl.
*F16H 57/04* (2010.01)
*F16H 57/08* (2006.01)

(52) U.S. Cl.
CPC ........ *F16H 57/0479* (2013.01); *F16H 57/046* (2013.01); *F16H 57/0427* (2013.01); *F16H 57/0441* (2013.01); *F16H 57/0486* (2013.01); *F16H 57/043* (2013.01); *F16H 57/0434* (2013.01); *F16H 57/0456* (2013.01); *F16H 57/0482* (2013.01); *F16H 57/082* (2013.01)

(58) Field of Classification Search
CPC .............. F16H 57/0482; F16H 57/0479; F16H 57/0441; F16H 57/0486; F16H 57/0427; F16H 57/0456; F16H 57/043; F16H 57/0434; F16H 57/082

See application file for complete search history.

(56) References Cited

U.S. PATENT DOCUMENTS

| | | | |
|---|---|---|---|
| 3,015,970 A * | 1/1962 | Mueller | F16H 48/08 475/160 |
| 5,391,125 A * | 2/1995 | Turra | F16H 1/2836 475/331 |
| 2003/0017903 A1* | 1/2003 | Duan | F16H 48/30 475/230 |
| 2010/0317477 A1* | 12/2010 | Sheridan | F02C 7/06 475/159 |

FOREIGN PATENT DOCUMENTS

| | | | | |
|---|---|---|---|---|
| FR | 2980546 A1 | * | 3/2013 | ............... F01B 1/02 |
| GB | 2160291 A | * | 12/1985 | ............... F16H 1/28 |
| GB | WO 2004097255 A2 | * | 11/2004 | ........... B04B 1/2016 |
| WO | WO 9518319 A1 | * | 7/1995 | ......... F16H 57/0482 |

* cited by examiner

*Primary Examiner* — Roger Pang
(74) *Attorney, Agent, or Firm* — Maschoff Brennan

(57) ABSTRACT

An epyciclic transmission has a sun gear rotational about a transmission axis, a plurality of planet wheels meshing with the sun gear, and a carrier which supports the planet wheels and is rotational about the transmission axis; the transmission also has a lubricating system provided with at least one nozzle arranged in fixed position, with a collection channel fixed with respect to the carrier and configured to receive a jet of oil exiting from the nozzle, and with at least one pump having a casing fixed to the carrier; the pump is actuated by means of a transmission device in response to the rotation of the carrier to pump the oil from the collection channel to zones on the carrier which require lubrication.

10 Claims, 3 Drawing Sheets

EPICYCLIC TRANSMISSION PROVIDED WITH A LUBRICATING SYSTEM

The present invention relates to an epyciclic transmission provided with a lubricating system.

BACKGROUND OF THE INVENTION

As is known, an epyciclic transmission comprises a sun gear, a ring gear and a plurality of toothed planet wheels, which are interposed between the sun gear and the ring gear and are supported by a carrier. A transmission of such a type is capable of transmitting the motion between coaxial shafts rotating at different speeds, and is very effective in providing such a function while maintaining small weight and volumes. Epyciclic transmissions are largely used also in aeronautical engines, for example to transmit the motion to the fan in turbofan engines.

In most applications, the carrier is of static type and is coupled to the fixed structure of the engine by means of a flexible element. Under these conditions, the components supported by the carrier (gears of the planet wheels, possible bearings, etc.) are lubricated without particular difficulty via ducts which are fixed with respect to the engine structure and to the carrier.

Nevertheless, certain applications employ a rotating carrier, for example when the carrier is connected to a rotating (driving or driven) shaft or when there is a need to maintain the same rotation direction between the sun gear and the ring gear. In these cases, a problem occurs when transferring the lubricant oil in an efficient and reliable manner from a static part (typically an oil tank) to a rotating part, i.e. the carrier and the components supported by the same.

The solutions currently in use include one or more pumps which transfer the oil under pressure into an annular recess about a sleeve which is fixed with respect to the carrier. The oil radially enters a passage of the sleeve and from here is conveyed to the components requiring lubrication. The oil pressure in the annular recess is ensured by seals configured to keep a particularly small radial backlash between the static part and the sleeve. The amount of such a backlash is accurately determined in the design step, so as to maximize the volumetric efficiency for the transfer of the lubricant oil.

The above-described oil transfer systems of known type are not satisfactory due to the high accuracy required when machining and mounting the components which define the aforesaid radial backlash. Furthermore, during the assembly operation, there is a non-negligible risk of damaging the seals when the sleeve is axially inserted, whereby the correct sealing is compromised.

Moreover, the above-described oil transfer system of known type is not able to compensate for the wear and inevitable variations of relative position between the static part and the rotating part (due to differences in temperature between the start-up conditions and the running conditions, for example). Furthermore, in current epyciclic transmissions for vehicles, the pressure and flow rate values required for the lubrication and the peripheral speed values of the carrier are relatively high and therefore may compromise the desired sealing, especially when the components are worn.

SUMMARY OF THE INVENTION

It is the object of the present invention to provide an epyciclic transmission provided with a lubricating system, which allows the above problems to be solved in a simple and cost-effective manner.

According to the present invention, an epyciclic transmission equipped with a lubricating system is provided, as defined in claim 1.

BRIEF DESCRIPTION OF THE DRAWINGS

The present invention will now be described with reference to the accompanying drawings, which show a non-limiting embodiment thereof, in which.

DETAILED DESCRIPTION OF THE INVENTION

Figure 1:
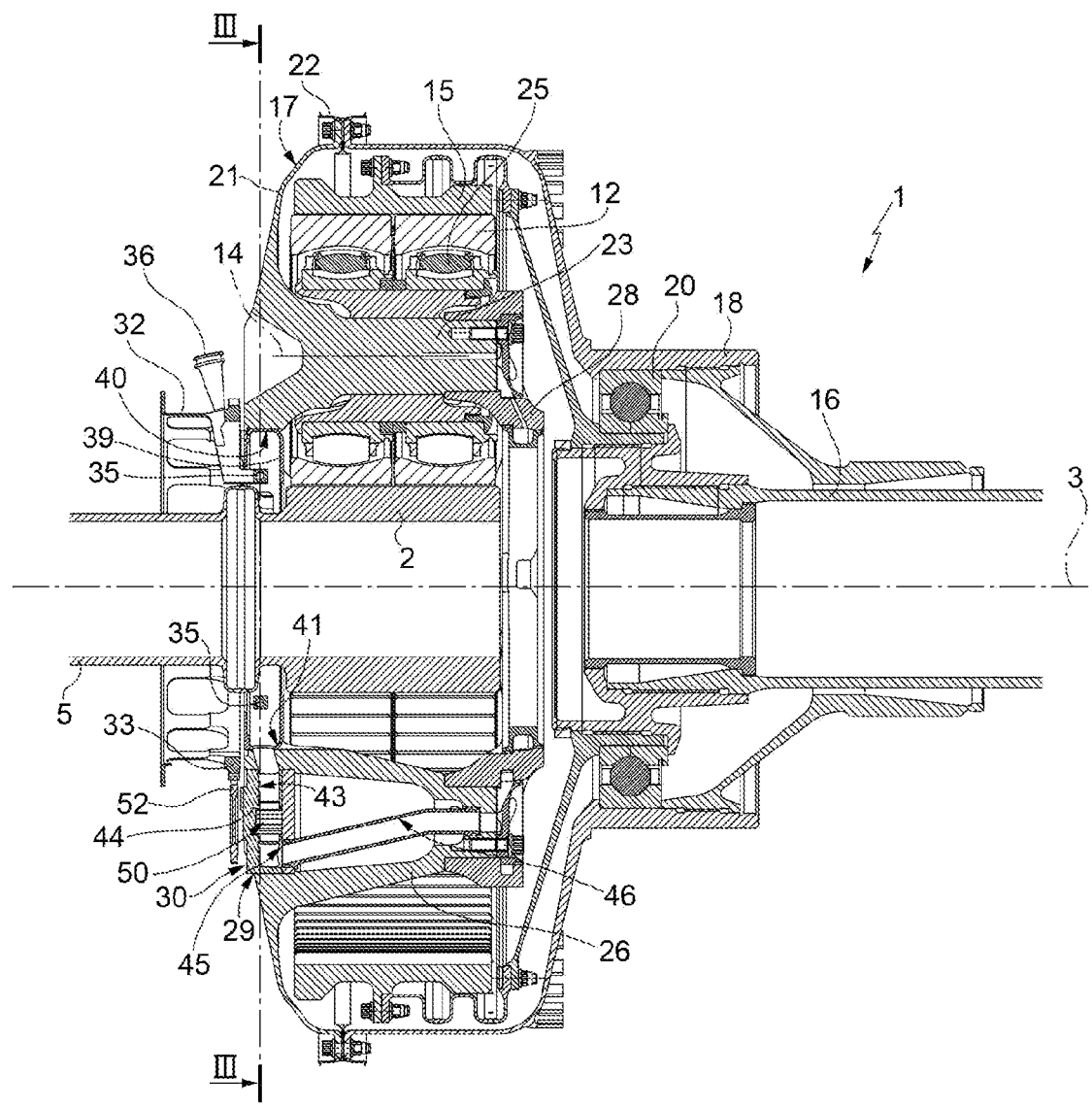
FIG. 1 is a section according to a meridian sectional plane of a preferred embodiment of the epyciclic transmission provided with a lubricating system according to the present invention.

With reference to FIG. 1, numeral 1 indicates an epyciclic transmission, in particular for aeronautical applications, comprising a sun gear 2, which is rotational about an axis 3 and is connected to a transmission shaft 5 in an angularly fixed manner.

Transmission 1 also comprises a plurality of planet wheels 12, which mesh with the sun gear 2 and are rotational about respective axes 14 (only one of which is shown in FIG. 1). The axes 14 are parallel and eccentric with respect to axis 3 and, in particular, are equally angularly spaced apart from one another about axis 3. At each of the axes 14, transmission 1 preferably has a pair of planet wheels 12 which are coaxial.

The planet wheels 12 radially mesh outwards with a ring gear 15, which is connected in an angularly fixed manner to a transmission shaft 16, which is coaxial with shaft 5 along axis 3 and is arranged on the opposite axial side with respect to shaft 5. The planet wheels 12 are supported, in a manner not described in detail, by a carrier 17, which is rotating about axis 3 and is preferably connected to a transmission member 18 in an angularly fixed manner. The transmission member 18 is coaxial to the shafts 5, 16 and in the specific example shown, is defined by a bell-shaped body which is axially hollow and is coupled to a portion of shaft 16 by means of a rolling bearing 20.

Carrier 17 is defined by a structure comprising an annular portion 21, which is coaxial to the sun gear 2, has a substantially plate-like shape, axially faces the planet wheels 12 and the ring gear 15, and is spaced apart from shaft 5 and sun gear 2. In particular, the annular portion 21 has an outer flange 22 arranged about the ring gear 15 and fixed to a corresponding flange of the bell-shaped body 18.

Carrier 17 further comprises a plurality of pins 23 (only one of which is shown in FIG. 1). The pins 23 extend along the axes 14 from the annular portion 21, are preferably made in a single piece with the latter, and support the planet wheels 12 by means of rolling bearings 25.

Carrier 17 also comprises a plurality of hollow portions 26 (only one of which is shown in FIG. 1). The portions 26 extend so as to protrude from the annular portion 21 in directions parallel to the axes 14 and in angular positions alternating with those of the planet wheels 12 about axis 3. The portions 26 are also preferably made in a single piece with the annular portion 21.

On the opposite axial side with respect to the annular portion 21, carrier 17 then comprises an annular plate 28 fixed to the axial ends of pins 23 and portions 26.

The portions 26 have respective openings 29 at plate 21, which are engaged by respective pumps 30 belonging to a lubricating system 31 (FIG. 2) which transfers lubricant oil from a fixed structure 32 (partly shown) to the zones (bearings, couplings between gears, etc.) on carrier 17 which require lubrication.

The fixed structure 32 is arranged about shaft 5, axially faces plate 21, and comprises a ring gear 33 which is coaxial with carrier 17, and at least one nozzle 35 which communicates, by means of a duct 36, with a pump (not shown) which draws the lubricant oil from a tank (not shown). In the specific example shown, two diametrically opposite nozzles 35 are included. The nozzles 35 define respective outlets which spray the lubricant oil along directions 37 (FIG. 2) which, in particular, are substantially tangent with respect to axis 3.

The lubricating system 31 comprises a rotating collector 39, which is arranged at an inner annular edge of portion 21, is fixed to carrier 17, and defines a collection channel 40 configured to receive the oil sprayed by the nozzles 35. In particular, channel 40 is an annular channel which has a continuous annular opening radially facing axis 3.

In the specific example shown, the rotating collector 39 is a channel added to carrier 17 and having a substantially U-shaped cross-section. Alternatively, channel 40 could be at least partly defined by portions of carrier 17.

Due to its rotation, the rotating collector 39 also drags the lubricant oil received into rotation, whereby the latter reaches a peripheral speed which is substantially equal to that of the rotating collector 39 itself. The oil is thus subjected to a centrifugal inertial action which keeps it radially against a bottom surface 41 of channel 40.

Nozzle 35 is preferably designed according to the supply pressure so as to make the outflow speed of the oil from nozzle 35 equal to the peripheral speed of surface 41 under a given operating condition. In particular, considering that the flow rate is constant, the sections of nozzle 35 are defined in the design step so as to bring the jet of oil to the desired speed. For example, the oil feeding pipe switches from cylindrical to conical in order to decrease the passage section (with relatively small taper angle, to keep the load losses low), to then become cylindrical again at the outlet.

The lubricating system 31 comprises at least one passage 42 which is made through the bottom surface 41 and carrier 17, and keeps channel 40 in permanent communication with an inlet 43 of the pumps 30. Due to the centrifugal field, the oil collected in channel 40 forms a head which ensures the supply of the oil to the pumps 30.

The pumps 30 comprise respective casings 44, which are fixed to carrier 17, define the inlets 43, and have respective outlets 45 which communicate with the zones requiring lubrication through a distribution circuit 46 (not described in detail).

Figure 2:
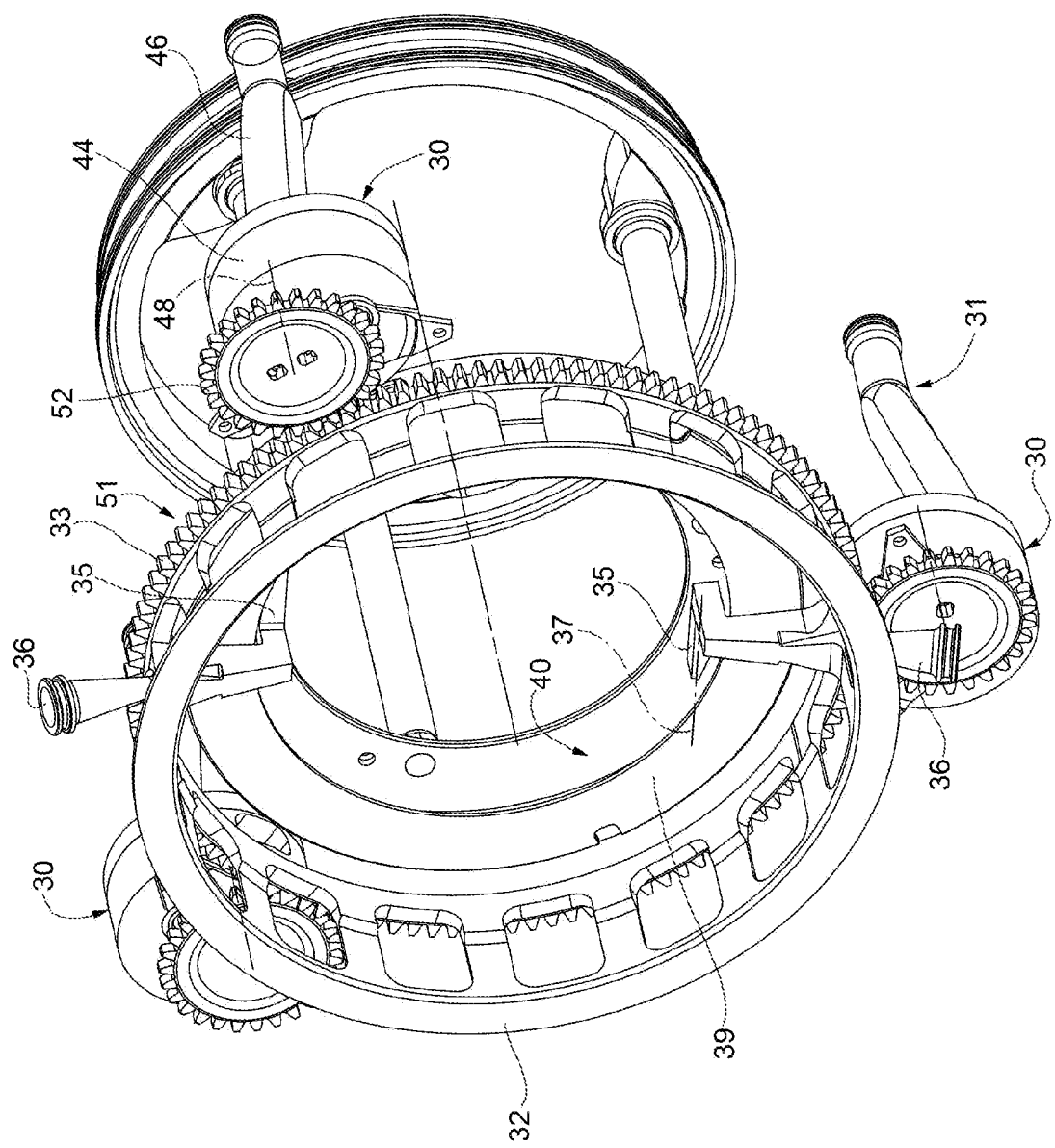
FIG. 2 shows a perspective view, with parts removed for clarity, of the lubricating system of the epyciclic transmission in FIG. 1.
Figure 3:
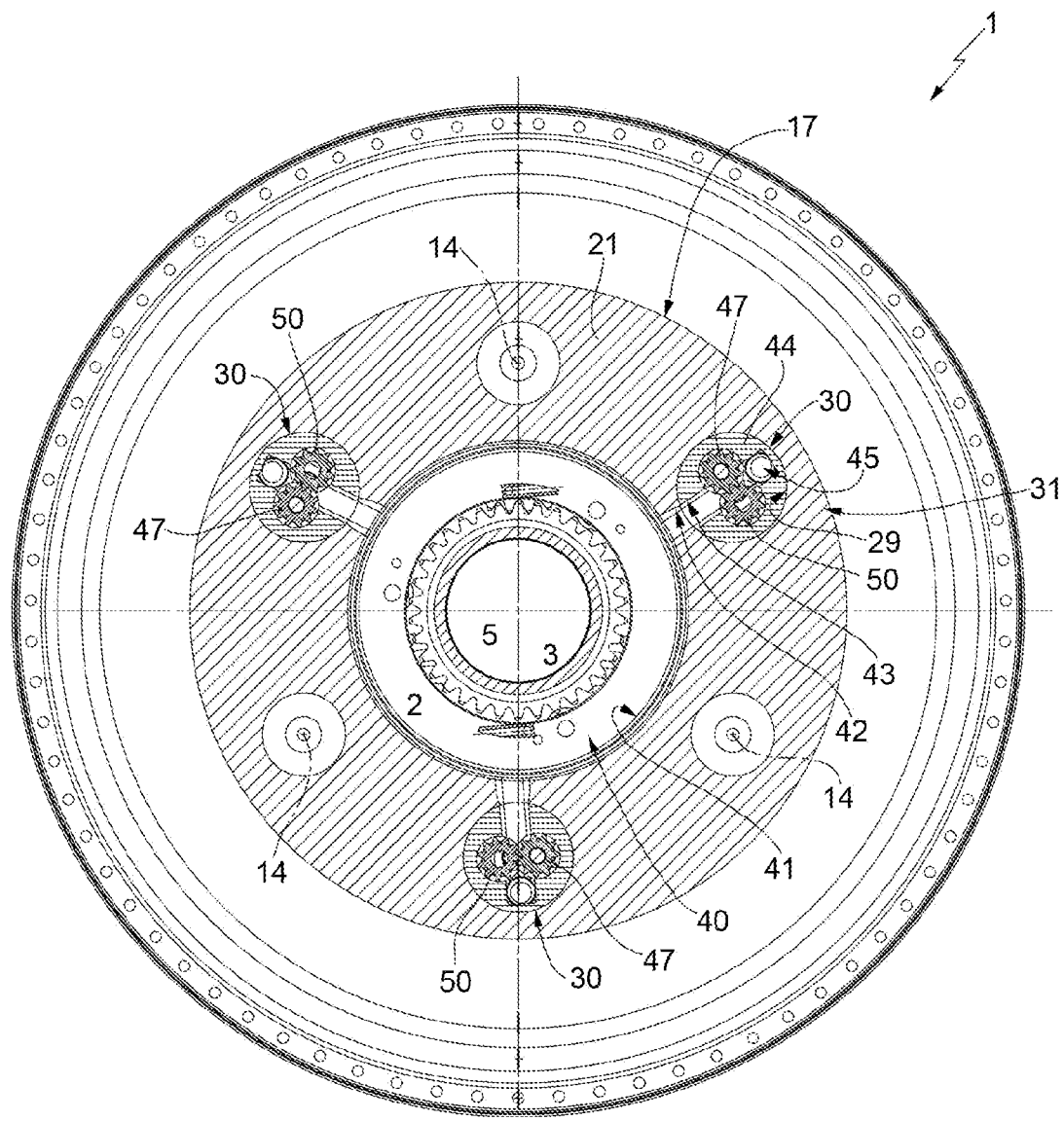
FIG. 3 is a cross section according to the sectional plane III-III in FIG. 1.

As shown in FIG. 3, the pumps 30 further comprise respective actuating shafts 47, which extend along respective axes 48 (FIG. 2) which are parallel and eccentric with respect to axis 3. The inlets 43 are preferably substantially radial with respect to axis 3, while the outlets 45 are substantially parallel to the axes 48.

The actuating shafts of the pumps 30 are connected to respective pumping devices 50 of the meshing type, for example, arranged inside the casings 44.

As shown in FIG. 2, the actuating shafts 47 axially protrude from the casings 44 so as to be actuated by a transmission device 51 which brings such shafts into rotation in response to the rotation of carrier 17 about axis 3. In particular, the transmission device 51 comprises the ring gear 33 and, for each pump 30, a corresponding toothed wheel 52, which is fitted in fixed and coaxial position onto an axial end of the actuating shaft 47 and meshes with the ring gear 33.

Therefore, during the rotation of carrier 17 about axis 3, the toothed wheels 52 roll along the ring gear thus rotating about their own axes 48. A correct definition of the backlashes between the toothings of the toothed wheels 52 and of the ring gear 33 allows the normal variations of relative position and the radial backlashes between carrier 17 and the static structure 32 to be compensated for.

The advantages brought by the lubricating system 31 of transmission 1 become apparent from the above disclosure.

Firstly, system 31 does not comprise any seal element which must ensure the sealing between the static structure 32 and carrier 17, because the lubricant oil is transferred to the rotating collector 39 by means of jets or sprays, that is without components in contact.

This configuration for the "remote" transfer of the lubricant oil allows risks of oil leakage between the static structure 32 and carrier 17 under running conditions to be eliminated, and allows the backlashes and position variations of carrier 17 with respect to the static structure 32 to be neglected within a given limit. Indeed, such backlashes and variations of relative position only affect the meshing between the toothed wheels 52 and the ring gear 33, where known technologies allow the coupling to be designed in an adequate and easy manner.

In order to minimize the oil leaks during the start-up steps, the oil may be pumped to the nozzles 35 with a flow rate which is proportional to the rotation speed of transmission 1: if there is in any case an excess part of oil, the latter transits outside transmission 1 and therefore does not compromise the operation thereof.

Again due to the configuration for the "remote" transfer of the lubricant oil, when assembling transmission 1, the risks of damaging the components are reduced as compared to known solutions which include seal elements in sliding contact between the static structure 32 and carrier 17.

It is then apparent that the lubricant oil is pumped by the devices 50 from the inlets 43 to the outlets 45 due to the rotation of carrier 17, without the aid of additional engines. The oil under pressure exiting the pumps 30 then reaches all the zones to be lubricated through the distribution circuit 46, as mentioned above.

The claimed solution is then relatively compact, does not compromise the rotation balance of carrier 17, and succeeds in causing the lubricant oil to flow at the pressures and at the flow rates required in the aeronautical field.

It is apparent from the above discussion that modifications or variants may be made to transmission 1 without departing from the scope of protection defined by the appended claims.

In particular, the oil may be pressurized by the pumps 30 by taking advantage of the relative movement between carrier 17 and planet wheels 12, between carrier 17 and ring gear 15, between carrier 17 and sun gear 2, instead of taking advantage of the relative movement between carrier 17 and fixed structure 32. For example, the ring gear 33 could be fixed to shaft 5 instead of being fixed to the fixed structure 32. Selecting one solution over another depends on the availability of spaces and/or opportunities to integrate the components in transmission already designed.

Device 51 could be different from a toothed transmission to rotate the toothed wheels 52 about their axes 48, for example it could have one or more toothed belts or could be of the cam and tappet type.

Moreover, the lubricating system 31 could be applied to different epyciclic transmissions, for example to transmissions of the so-called "planetary" type and/or to transmissions using a different support system for the planet wheels 12.

The invention claimed is:

1. An epyciclic transmission comprising:
   a sun gear rotational about a transmission axis;
   a plurality of planet wheels meshing with said sun gear;
   a carrier which supports said planet wheels and is rotational about said transmission axis;
   a lubricating system adapted to transfer lubricant oil from a static structure to zones requiring lubrication on said carrier;
   characterized in that said lubricating system comprises:
   at least one nozzle arranged in fixed position and adapted to receive pressurized oil;
   a collection channel fixed with respect to said carrier and configured so as to receive a jet of oil exiting from said nozzle;
   at least one pump comprising:
   a) a casing fixed to said carrier;
   b) an inlet communicating with said collection channel;
   c) an outlet communicating with the zones requiring lubrication;
   d) a pumping device configured to pump oil from said inlet to said outlet;
   a transmission assembly configured to actuate said pumping device in response to the rotation of said carrier about said transmission axis.

2. An epyciclic transmission according to claim 1, characterized in that said transmission assembly comprises a transmission wheel fitted in a fixed and coaxial position to an actuating shaft of said pump.

3. An epyciclic transmission according to claim 2, characterized in that said transmission assembly further comprises a ring gear coaxial to said carrier and coupled to said transmission wheel.

4. An epyciclic transmission according to claim 3, characterized in that said ring gear is fixed.

5. An epyciclic transmission according to claim 3, characterized in that said transmission wheel has a toothing meshing directly with said ring gear.

6. An epyciclic transmission according to claim 1, characterized in that said pump has an actuating shaft having a rotation axis which is parallel and eccentric with respect to said transmission axis.

7. An epyciclic transmission according to claim 1, characterized in that said lubricating system comprises a plurality of said pumps arranged about said transmission axis.

8. An epyciclic transmission according to claim 1, characterized in that said collection channel is a continuous annular channel, having an annular opening facing radially inwards with respect to said transmission axis.

9. An epyciclic transmission according to claim 1, characterized in that said carrier comprises an annular plate portion axially facing said planet wheels; said collection channel being arranged along an annular edge of said annular plate portion.

10. An epyciclic transmission according to claim 1, characterized in that said at least one nozzle is spaced apart from said collection channel by a gap absent of intervening components.

* * * * *